United States Patent
Okamoto et al.

(10) Patent No.: US 7,425,366 B2
(45) Date of Patent: Sep. 16, 2008

(54) TAPE MEMBER OR SHEET MEMBER, AND METHOD OF PRODUCING TAPE MEMBER OR SHEET MEMBER

(75) Inventors: Tetsushi Okamoto, Kawasaki (JP); Fumio Sawa, Tokyo (JP); Noriyuki Iwata, Sagamihara (JP); Mikio Kakiuchi, Yokohama (JP); Toshimitsu Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/486,217

(22) Filed: Jul. 14, 2006

(65) Prior Publication Data

US 2006/0258791 A1    Nov. 16, 2006

Related U.S. Application Data

(63) Continuation of application No. PCT/JP2005/000479, filed on Jan. 17, 2005.

(30) Foreign Application Priority Data

Jan. 15, 2004    (JP) .............................. 2004-008270

(51) Int. Cl.
    *B32B 5/16*    (2006.01)
(52) U.S. Cl. ....................... 428/323; 428/324; 428/328; 428/329; 428/330; 428/331
(58) Field of Classification Search ....................... None
    See application file for complete search history.

(56) References Cited

U.S. PATENT DOCUMENTS

| | | | |
|---|---|---|---|
| 4,806,806 A | | 2/1989 | Hjortsberg et al. |
| 5,079,077 A | * | 1/1992 | Sakayanagi et al. .......... 442/212 |
| 5,441,682 A | * | 8/1995 | Baker et al. .................... 264/82 |
| 6,190,775 B1 | | 2/2001 | Smith et al. |
| 6,359,232 B1 | * | 3/2002 | Markovitz et al. ........... 174/209 |

FOREIGN PATENT DOCUMENTS

| | | |
|---|---|---|
| DE | 2 142 571 | 6/1972 |
| JP | 55-53802 | 4/1980 |
| JP | 61-30041 | 2/1986 |
| JP | 61-142614 | 6/1986 |
| JP | 63-144163 | 6/1988 |
| JP | 5-86596 | 4/1993 |
| JP | 7-33983 | 2/1995 |
| JP | 11-66964 | 3/1999 |
| JP | 11-323162 | 11/1999 |
| JP | 2000-58314 | 2/2000 |
| JP | 2002-93257 | 3/2002 |
| JP | 2003-530661 | 10/2003 |
| JP | 2003-321658 | 11/2003 |
| WO | WO 01/63624 | 8/2001 |

* cited by examiner

*Primary Examiner*—Sheeba Ahmed
(74) *Attorney, Agent, or Firm*—Oblon, Spivak, McClelland, Maier & Neustadt, P.C.

(57) ABSTRACT

The invention aims to provide a highly heat conductive tape member or sheet member and a method for easily producing a highly heat conductive tape member or sheet member. The mica tape member or mica sheet member of the invention includes a mica-containing layer and a lining material, and the mica-containing layer contains scaly particles, particles having a heat conductivity of 0.5 W/mK or higher and a size of 1 μm or smaller, and a binder.

7 Claims, 12 Drawing Sheets

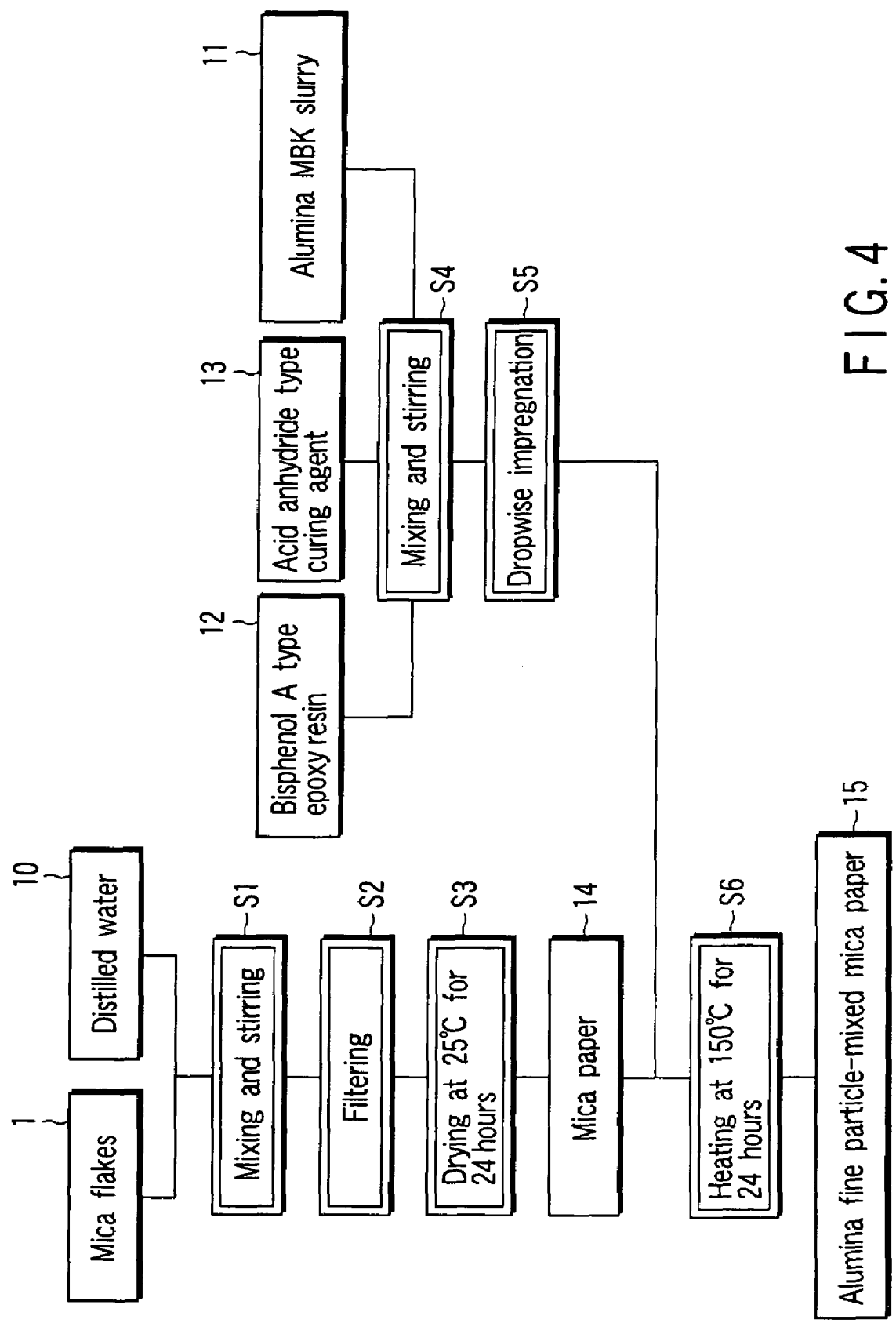
F I G. 4

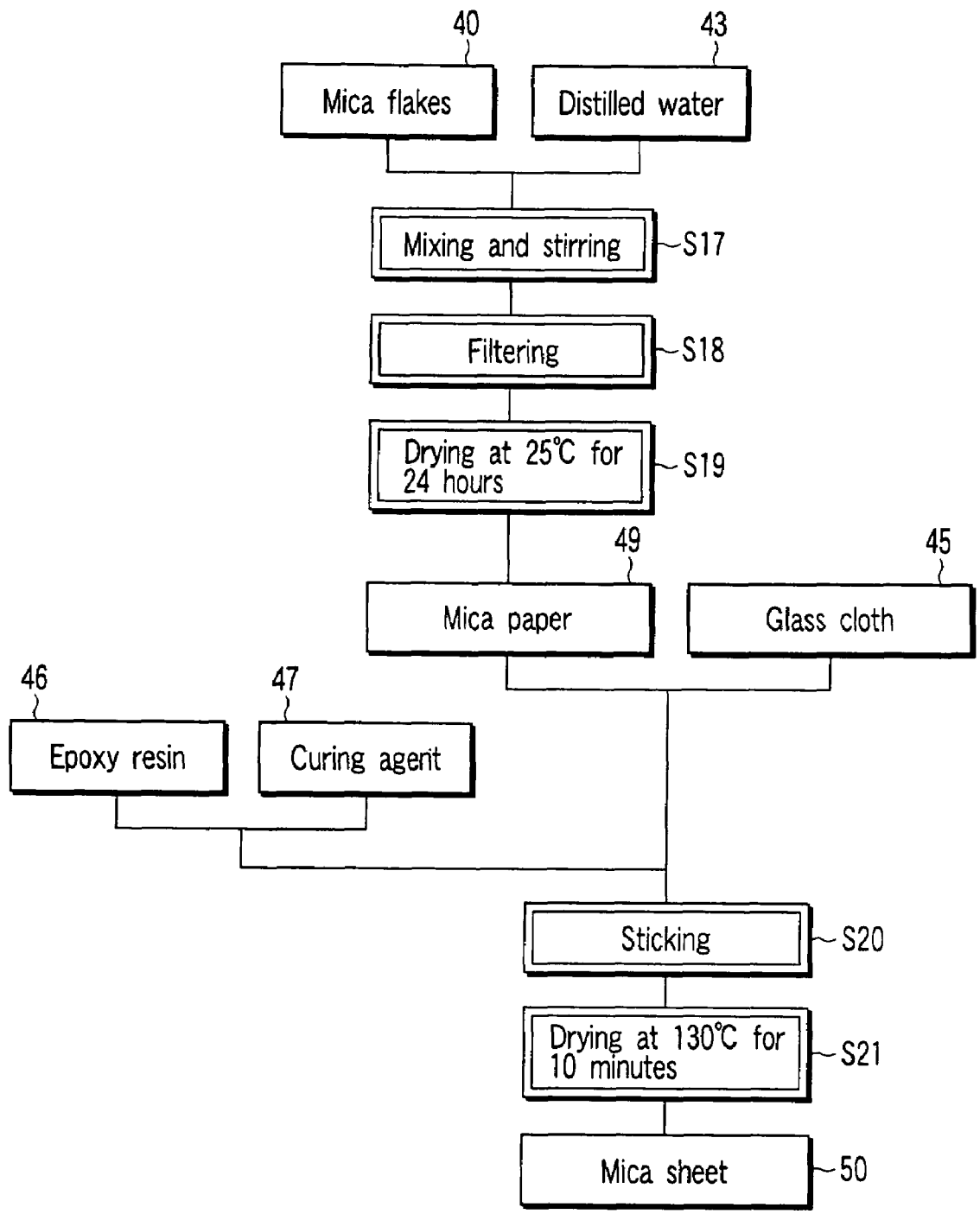
F I G. 10

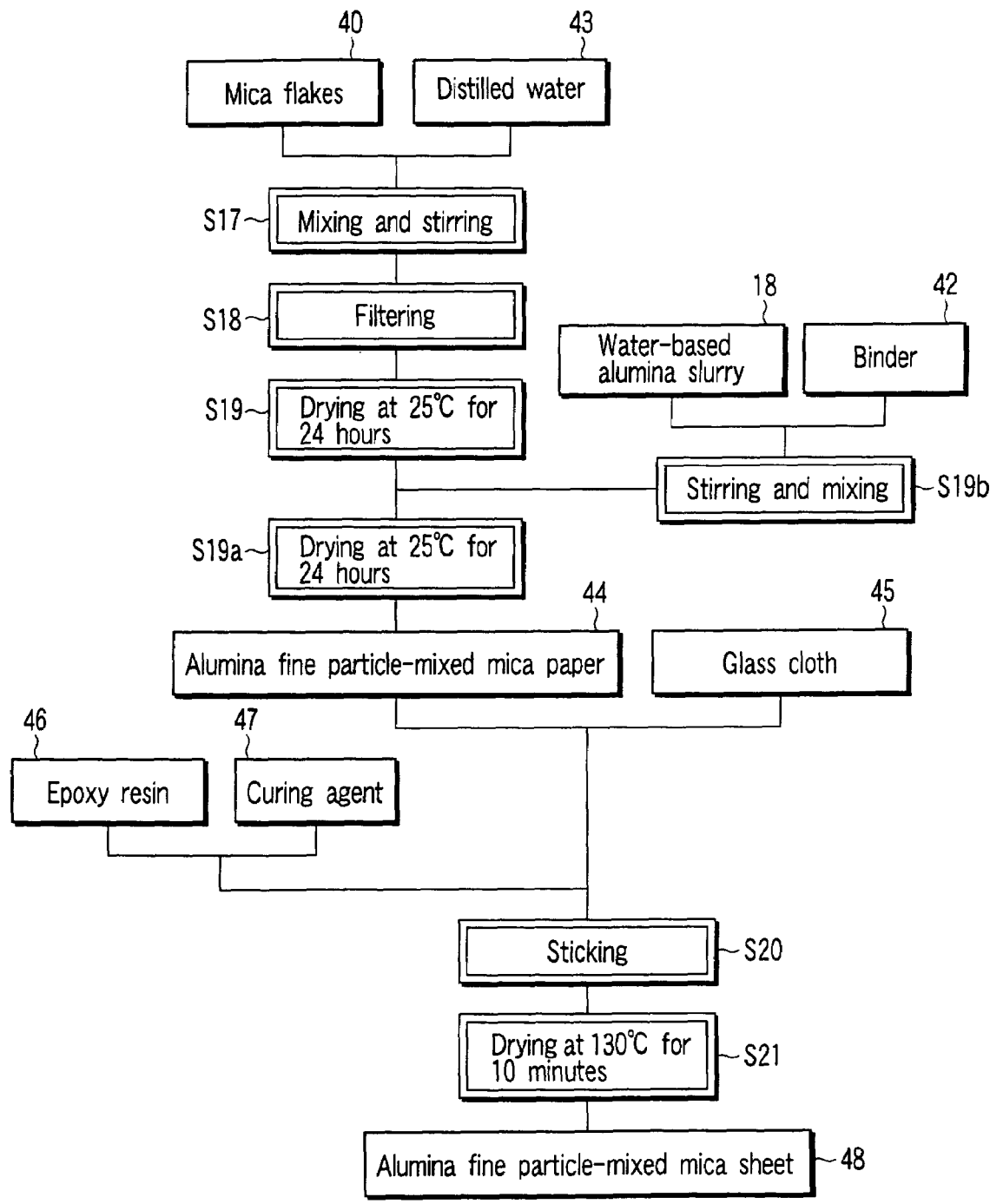
F I G. 12

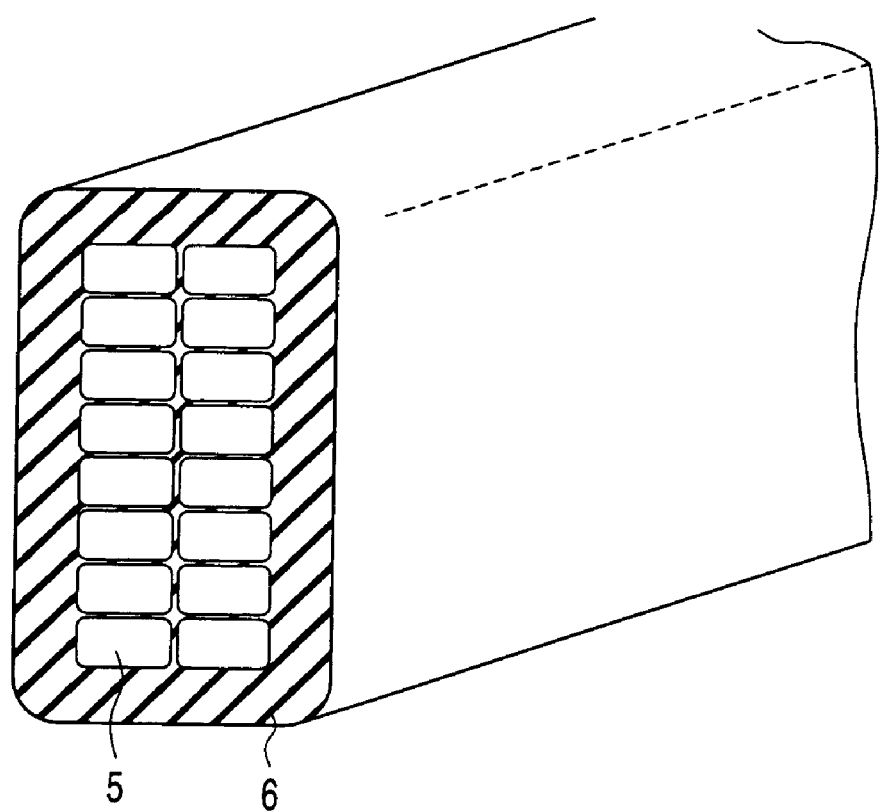
F I G. 15
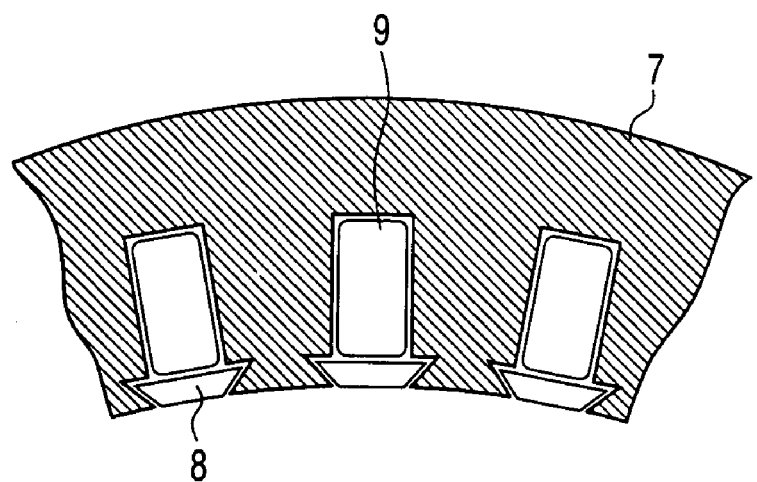
F I G. 16

TAPE MEMBER OR SHEET MEMBER, AND METHOD OF PRODUCING TAPE MEMBER OR SHEET MEMBER

CROSS-REFERENCE TO RELATED APPLICATIONS

This is a Continuation Application of PCT Application No. PCT/JP2005/000479, filed Jan. 17, 2005, which was published under PCT Article 21(2) in Japanese.

This application is based upon and claims the benefit of priority from prior Japanese Patent Application No. 2004-008270, filed Jan. 15, 2004, the entire contents of which are incorporated herein by reference.

BACKGROUND OF THE INVENTION

1. Field of the Invention

The present invention relates to a tape member or a sheet member to be used for electromagnetic coils, electromagnetic appliances, or the like and a method of producing a tape member or a sheet member.

2. Description of the Related Art

Electromagnetic appliances can be made highly efficient, compact, and economical by improving a cooling property of an electromagnetic coil. As a method of improving the cooling property of an electromagnetic coil, it is desired for an electric insulation material that is to be used in the periphery of the electromagnetic coil to be highly thermally conductive. So far, a highly heat conductive mica-based sheet-like body having a lining material containing inorganic powder has been disclosed (reference to Patent Document 1). However, according to this method, since the mica layer does not show sufficient heat conduction, the heat conductivity of an insulating layer is insufficient in the case of production of an electromagnetic coil.

Also, a method of improving the heat conductivity of a resin by using a crystalline epoxy resin as the resin is published (reference to Patent Document 2). However, the resin is difficult to handle because it is solid at a normal temperature.

Further, a method of using a scaly and highly heat conductive material and mica is published (reference to Patent Document 3). However, in this method, unless the scaly and highly heat conductive material has a sufficiently high aspect ratio, mica paper cannot be produced and, although scaly alumina is employed as an example of a material having a high aspect ratio, which is the ratio of the diameter and the thickness, alumina has a high dielectric constant and thus is not preferable for an electric insulation material.

Patent Document 1: Jpn. Pat. Appln. KOKAI Publication No. 2002-93257

Patent Document 2: Jpn. Pat. Appln. KOKAI Publication No. 11-323162

Patent Document 3: Jpn. Pat. Appln. KOKAI Publication No. 2000-58314

BRIEF SUMMARY OF THE INVENTION

An object of the present invention is to provide a highly heat conductive tape member or sheet member and a method for easily producing a highly heat conductive tape member or sheet member.

According to the present invention corresponding to an embodiment 1, a mica tape member or mica sheet member comprising a mica-containing layer and a lining material, wherein the mica-containing layer contains scaly particles, particles having a heat conductivity of 0.5 W/mK or higher and a size of 1 μm or smaller, and a binder.

According to the present invention corresponding to an embodiment 8, a method of producing a tape member or sheet member comprising:

a first step of obtaining a mixed solution by mixing scaly particles, a slurry obtained by mixing particles having a heat conductivity of 0.5 W/mK or higher and a size of 1 μm or smaller in water or a solvent, and a binder in a medium;

a second step of obtaining fine particle-mixed paper consisting of the scaly particles and the particles having a heat conductivity of 0.5 W/mK or higher and a size of 1 μm or smaller by filtering and drying the mixed solution obtained in the first step; and a third step of sticking the fine particle-mixed paper obtained in the second step and a lining material.

According to the present invention corresponding to an embodiment 9, a method of producing a tape member or sheet member comprising:

a first step of obtaining a mixed solution by mixing scaly particles and a slurry obtained by mixing particles having a heat conductivity of 0.5 W/mK or higher and a size of 1 μm or smaller in water or a solvent in water;

a second step of filtering and drying the mixed solution obtained in the first step for obtaining intermediate paper, impregnating the obtained intermediate paper with a binder and drying for obtaining fine particle-mixed paper consisting of the scaly particles and the particles having a heat conductivity of 0.5 W/mK or higher and a size of 1 μm or smaller; and a third step of sticking the fine particle-mixed paper obtained in the second step and a lining material.

According to the present invention corresponding to an embodiment 10, a method of producing a tape member or sheet member comprising:

a first step of obtaining a slurry solution by mixing a binder with a slurry obtained by mixing particles having a heat conductivity of 0.5 W/mK or higher and a size of 1 μm or smaller in water or a solvent;

a second step of obtaining a scaly particle-containing slurry by mixing scaly particles with water or a solvent;

a third step of obtaining intermediate paper by filtering and drying the scaly particle-containing slurry obtained in the second step;

a fourth step of obtaining fine particle-mixed paper consisting of the scaly particles and the particles having a heat conductivity of 0.5 W/mK or higher and a size of 1 μm or smaller by impregnating the intermediate paper obtained in the third step with the slurry solution obtained in the first step and successively drying the slurry solution; and a fifth step of sticking the fine particle-mixed paper obtained in the fourth step and a lining material.

According to the present invention corresponding to an embodiment 11, a method of producing a tape member or sheet member comprising:

a first step of obtaining a mixed solution by mixing a metal alkoxide, water, and a solvent;

a second step of obtaining a sol solution by mixing a catalyst with the mixed solution obtained in the first step;

a third step of obtaining intermediate paper by filtering and drying a solution obtained by mixing scaly particles and water;

a fourth step of obtaining fine particle-mixed paper by impregnating the paper obtained in the third step with the sol solution obtained in the second step and drying the paper; and a fifth step of sticking the fine particle-mixed paper obtained in the fourth step and a lining material.

According to the present invention corresponding to an embodiment 12, a method of producing a tape member or sheet member comprising:

a first step of obtaining a mixed solution by mixing a metal alkoxide, water, a slurry obtained by mixing particles having a heat conductivity of 0.5 W/mK or higher and a size of 1 μm or smaller in water or a solvent, and a solvent;

a second step of obtaining a sol solution by mixing a catalyst with the mixed solution obtained in the first step;

a third step of obtaining intermediate paper by filtering and drying a solution obtained by mixing scaly particles and water;

a fourth step of obtaining fine particle-mixed paper by impregnating the paper obtained in the third step with the sol solution obtained in the second step and drying the paper; and a fifth step of sticking the fine particle-mixed paper obtained in the fourth step and a lining material.

According to the present invention corresponding to an embodiment 13, a method of producing a tape member or sheet member comprising:

a first step of obtaining a mixed solution by mixing a metal alkoxide, water, and a solvent having a heat conductivity of 0.5 W/mK or higher;

a second step of obtaining a sol solution by mixing a catalyst with the mixed solution obtained in the first step;

a third step of obtaining intermediate paper by filtering and drying a solution obtained by mixing scaly particles and water;

a fourth step of obtaining fine particle-mixed paper by impregnating the paper obtained in the third step with the sol solution obtained in the second step and drying the paper; and a fifth step of sticking the fine particle-mixed paper obtained in the fourth step and a lining material.

BRIEF DESCRIPTION OF THE SEVERAL VIEWS OF THE DRAWING

FIG. 4 is a flow chart describing a method of producing alumina fine particle-mixed mica paper of Example 2 of the invention;

FIG. 10 is a flow chart describing a method of producing a conventional mica sheet;

FIG. 12 is a flow chart describing a method of producing alumina fine particle-mixed mica sheet of Example 10 of the invention;

FIG. 15 is a cross-sectional view of a portion of a coil of a generator for explaining Example 13 of the invention; and FIG. 16 is a cross-sectional view of a portion of a coil of a generator for explaining Example 14 of the invention.

DETAILED DESCRIPTION OF THE INVENTION

Example 1

Figure 1:
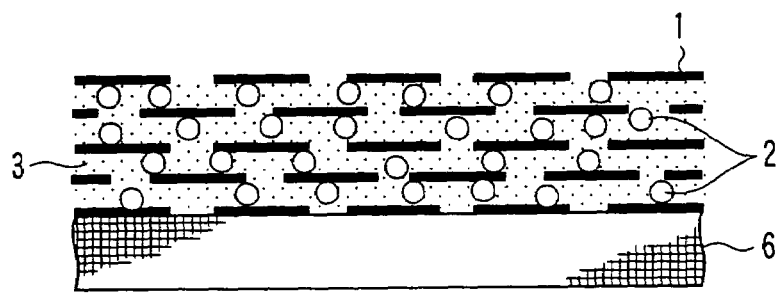
FIG. 1 is a cross-sectional view of a sheet member or a tape member for explaining Example 1 of the invention.

FIG. 1 shows a cross-sectional view of a mica tape member or a mica sheet member of the present invention. The mica tape member or the mica sheet member comprises a layer containing mica and a lining material, and the mica-containing layer consists of scaly particles 1, particles 2 having a heat conductivity of 0.5 W/mK or higher and a size of 1 μm or smaller (hereinafter, referred to as heat conductive particles), and a binder 3.

The scaly particles 1 contain at least one of mica and boron nitride.

The heat conductive particles 2 contain at least one of boron nitride, alumina, silicon nitride, magnesium oxide, carbon, aluminum nitride, silicon oxide (silica), artificial diamond, and titanium oxide.

Further, the lining material 6 may be a glass cloth or a polymer film such as a polyester, polyethylene terephthalate, and Nomex (trade name).

Boron nitride (HP-1CAW, manufactured by Mizushima Ferroalloy Co., Ltd.) was employed as the scaly particles 1, an isopropylene elastomer, which is one example of water-soluble polymers, (Septon 2007, manufactured by Kuraray Co., Ltd.) was used as the binder 3, the elastomer was compounded with boron nitride, and carbon black (Asahi Thermal, manufactured by Asahi Carbon Co., Ltd.) with an average particle diameter of 90 nm as the heat conductive particles 2 was added to the compound. In this case, the volume of boron nitride to be added was kept constant, that is, 0.6 times the total volume of boron nitride and the isopropylene type elastomer.

Figure 2:
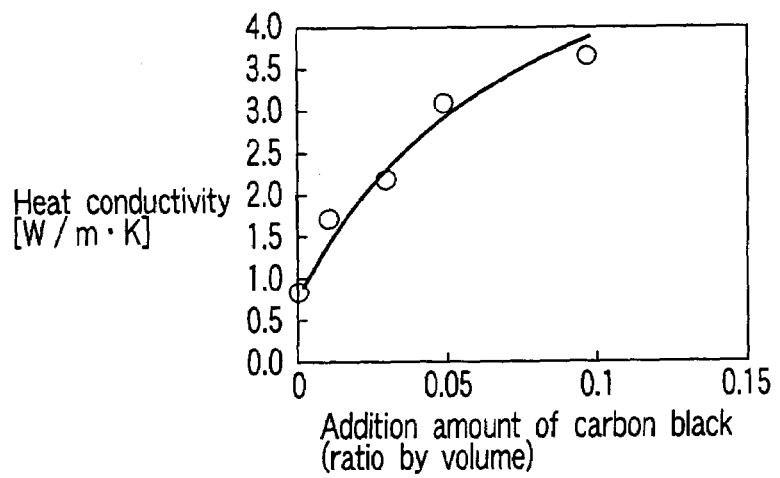
FIG. 2 is a drawing showing the dependency of heat conductivity of the sheet member or the tape member shown in FIG. 1 on carbon black content.

With such constitution, the heat conductivity is increased in proportion to the addition amount of carbon black, as shown in FIG. 2. On the other hand, in the case of the resin mixed with nothing, the heat conductivity is in the range from 0.25 to 0.5 (W/mK) and in the case only boron nitride is added, addition of carbon black just like this case, a heat conductivity approximately 4 times as high can be obtained. It is believed that the carbon black particles exist among boron nitride particles, and that the elastic modulus of the resin among the boron nitride particles is increased, and consequently, the flow of heat among the boron nitride particles is improved to result in improvement of the heat conduction property.

Figure 3:
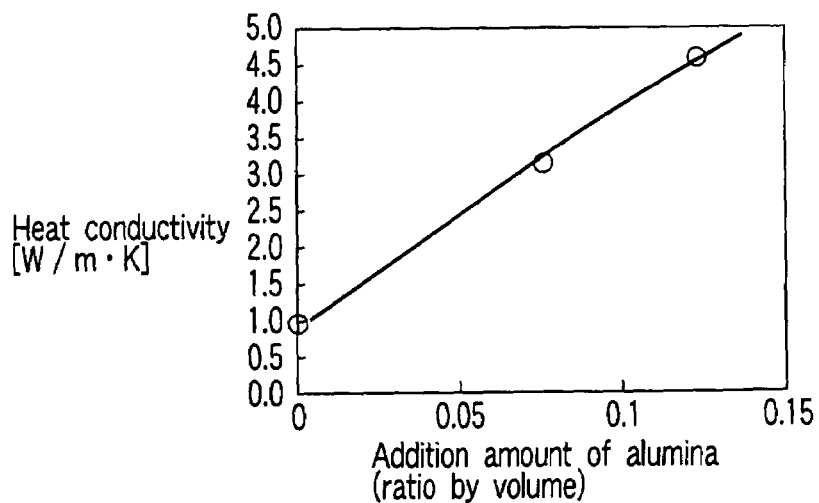
FIG. 3 is a drawing showing the dependency of heat conductivity of the sheet member or the tape member shown in FIG. 1 on alumina content.

FIG. 3 shows the case in which alumina with a size of 70 nm is added in place of carbon black as the heat conductive particles 2. In this case, the heat conductivity is found further improved as compared to the case of adding carbon black. This result is described in PCT/JP03/08564, which the applicant of this invention disclosed. In such a manner, a high heat conductivity can be obtained by compounding mica flakes and alumina particles.

Accordingly, 3 (g) of mica flakes and 1 (g) of a water slurry (manufactured by C.I.E.) containing 15 (wt %) of alumina with a size of 40 (nm) were mixed and stirred (for electric field breakage) in 2000 (ml) of distilled water and the resulting solution was poured onto filter paper for filtering water, after which the filter paper was left and dried at 25° C. for 24 hours to obtain mica paper in which mica flakes and fine alumina were compounded. However, such fine alumina-compounded mica paper was so inferior in the strength as to be torn if touched and thus was hard to handle. It is believed that the existence of the fine particles among mica flakes weakens the bonding force owing to the van der Waals force among mica flakes.

To strengthen the bonding force, polyethylene glycol, a water-soluble polymer, was dissolved in 2000 (ml) of distilled water to 1 (phr) of mica flakes and then fine alumina-compounded mica paper was obtained in the same manner as described above. As a result, mica paper having sufficiently high strength to handle it was obtained. In the mica tape or the mica sheet comprising the mica layer and the lining material obtained in such a manner, since the mica layer contained scaly particles, particles having a heat conductivity of 0.5 (W/mK) or higher, and a binder, highly heat conductive electromagnetic coils and electromagnetic appliances having high heat conductivity that can easily be manufactured could be produced.

Herein, if boron nitride is used in place of the mica layer as the scaly particles, since boron nitride has a heat conduction property several ten times as high as that of the mica layer, a very high heat conductivity can be obtained. Although those using scaly alumina have been proposed before, since the dielectric constant of alumina is as high as 7, the electric field in the surface of an insulating material is strengthened if it is used as an electric insulator. Accordingly, the electric property (dielectric loss) is deteriorated at the time of high voltage application. On the other hand, the dielectric constant of boron nitride is 4, which is approximately the same as that of mica and thus the electric property is not deteriorated.

As described, use of boron nitride in place of mica or use of mica together with boron nitride makes it possible to provide highly heat conductive electromagnetic coils and electromagnetic appliances having high heat conductivity that can be manufactured easily.

The heat conductivity of the heat conductive particles is limited to 0.5 (W/mK), because it is important for the heat conductive particles to have a higher heat conductivity than the bonding agent to be a binder. In this case, polyethylene glycol was used as the binder, and water-solubility is important and it is clear that the same effect can be obtained even in the case of using other water-soluble polymers. If the binder is water-soluble, there is no need to change the steps of a conventional production method and thus such a binder is convenient.

Example 2

A tape member or sheet member of Example 2 of the invention was obtained by using a thermoplastic resin or a thermosetting resin as a binder. In Example 1, the water-soluble polymer was used as the binder. In a conventional method of producing a mica tape member or sheet member, since no water-soluble polymer is used, it results in a cost hike. To solve such a problem, the following mica paper was obtained.

As shown in FIG. 4, mica was used as the scaly particles 1, and the particles were stirred and mixed in distilled water 10 (S1) and the obtained solution was filtered (S2), after which the resulting paper filter was dried at 25° C. for 24 hours (S3) to obtain mica paper 14. On the other hand, a methyl isobutyl ketone slurry 11 of alumina with a size of 40 (nm) (alumina MIBK slurry) was used in place of a water slurry of alumina used in Example 1, and 20 (g) of liquid epoxy resin 12 (CY 225, manufactured by Ciba Specialty Chemicals Inc.) and 16 (g) of an acid anhydride curing agent 13 (HY 925, manufactured by Ciba Specialty Chemicals Inc.) were mixed and stirred with 1000 (ml) of the methyl isobutyl ketone slurry of alumina with a size of 40 (nm) (S4) to obtain uncured resin. The uncured thermosetting resin was impregnated with the mica paper 14 obtained as described above (S5) and dried and cured at 150° C. for 24 hours (S6) to obtain alumina fine particle-mixed mica paper 15.

The above-mentioned Example is an example of using the thermosetting resin as a binder, but a thermoplastic resin may be used in place of the thermosetting resin.

The mica paper produced in the above-mentioned manner had sufficient strength to enable easy handling. As previously described, with respect to the tape or sheet member, use of a thermoplastic resin or a thermosetting resin as a binder makes it possible to provide highly heat conductive electromagnetic coils and electromagnetic appliances having high heat conductivity that can be easily manufactured.

Example 3

The techniques described in Examples 1 and 2 are techniques for holding nano-alumina with a size of 40 (nm) with the polymer type binders, and although the techniques improve the heat conduction, the heat conductivity of a polymer is at highest 0.5 (W/mK) or so and thus it is limited.

Figure 5:
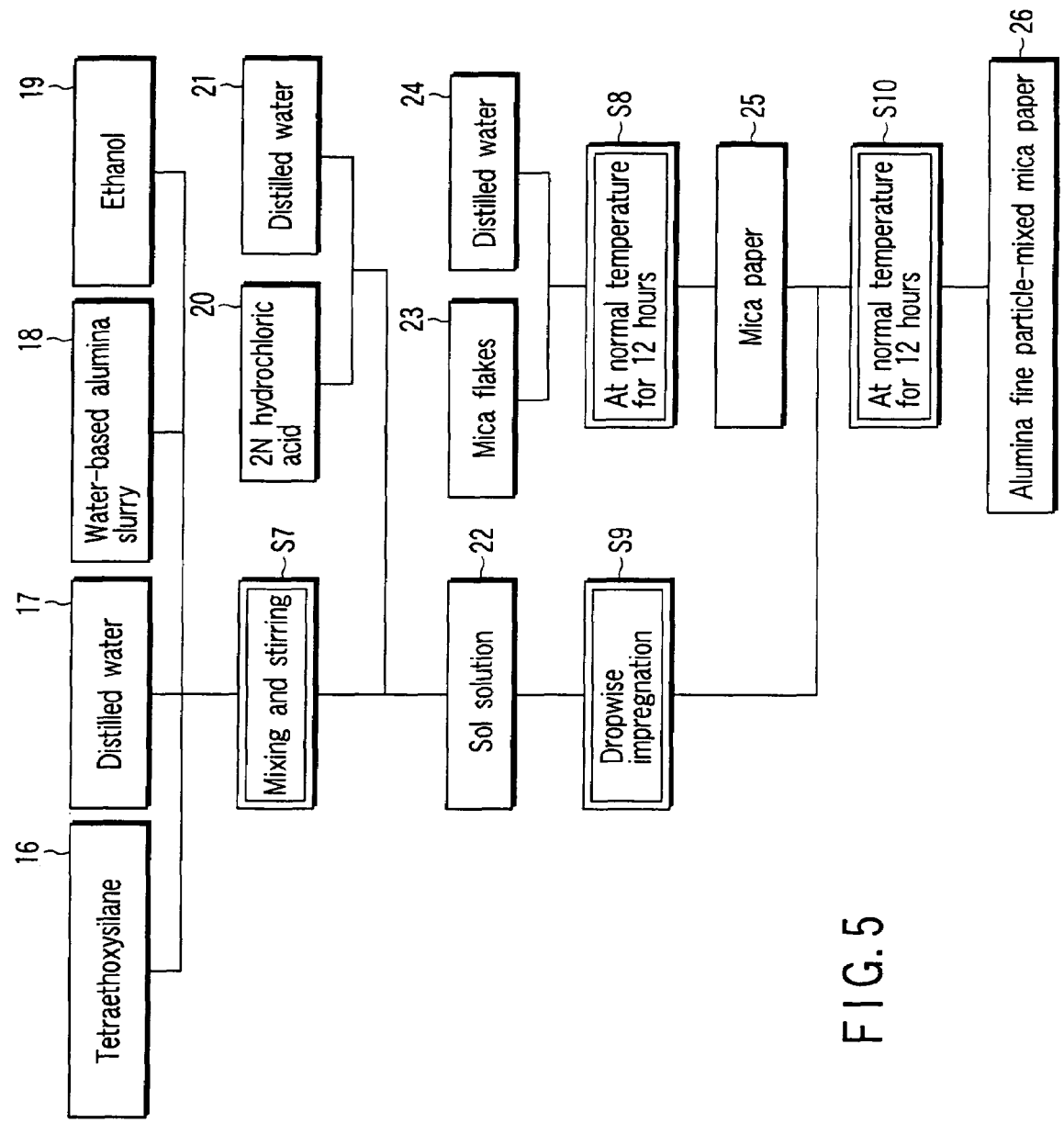
FIG. 5 is a flow chart describing a method of producing alumina fine particle-mixed mica paper of Example 3 of the invention.

Therefore, a substance precipitated or synthesized by a sol-gel method and containing an organic type resin was used as a binder in Example 3. Specifically, as shown in FIG. 5, a metal alkoxide, e.g., 10 (ml) of tetraethoxysilane 16 (for example, manufactured by High Purity Chemistry), a water-based alumina slurry 18 obtained by mixing 15 (wt %) of alumina with a size of 40 (nm) in 20 (ml) of distilled water 17, and 10 (ml) of ethanol 19 were put in a beaker and stirred and mixed for 20 minutes by a stirrer (S7). After that, a catalyst, for example, 1 (ml) of hydrochloric acid (2N hydrochloric acid) 20 mixed with distilled water 21 was dropwise added to the obtained slurry mixture under stirring condition and the resulting mixture was stirred for 10 minutes to obtain a sol solution 22. A dispersion obtained by dispersing the mica flakes 23 in distilled water 24 was filtered and left at a normal temperature and normal pressure for 12 hours (S8) to obtain mica paper 25, onto which the above-described sol solution 22 was dropped under a predetermined condition (S9), and the resulting paper was left at a normal temperature and normal pressure for 12 hours (S10) to obtain alumina particle-mixed mica paper 26.

The above-mentioned binder was dropwise added so as to control the binder at a ratio of 10 (ml) to 600 (cm$^2$) to the mica paper. The mica paper 26 obtained in such a manner had sufficiently high strength to handle it.

Twenty four sheets of mica paper 26 obtained in such a manner were laminated and impregnated with a bisphenol A type epoxy resin in vacuum and cured to produce a mica plate. The curing was carried out under a temperature condition of 150° C. for 10 hours. The thickness of the mica plate was controlled to be 2 mm. The heat conductivity of the mica plate produced in such a manner was measured at 62° C. by an acetone-benzene method to find it was 0.36 (W/mK). For comparison, twenty four sheets of mica paper containing neither alumina particles nor the binder were laminated and impregnated with the epoxy resin in vacuum and cured to produce a mica plate as shown in Comparative Example of Table 1 and the heat conductivity of the mica plate was 0.23 (W/mK). On the other hand, the heat conductivity of Example 3 was 0.36 (W/mK). Accordingly, in comparison of the heat conductivities between Comparative Example and Example 3, the heat conductivity of Example 3 is about 1.55 times as high as that of the Comparative Example, and thus has a high heat conductivity.

In this case, it is supposed that the existence of the fine alumina among mica flakes surrounded with the inorganic binder increases the thermal contact among the mica flakes.

Beside the catalyst used in Example 3, an acid such as acetic acid and a boron trifluoride solution or an alkali such as ammonia water, sodium hydroxide water, and an amine may be used in the same manner.

TABLE 1

|  | Comparative Example | Example 3 | Example 4 |
|---|---|---|---|
| Mica adhesion ratio | 120 g/m$^2$ | 120 g/m$^2$ | 120 g/m$^2$ |
| Alumina fine particles | None | 5 parts to 100 parts of mica | None |
| Binder | None | Inorganic binder | Inorganic binder |
| Heat conductivity | 0.23 W/mK | 0.36 W/mK | 0.32 W/mK |

Example 4

In Example 3, a technique of adding alumina with a size of 40 (nm) in the inorganic binder was described.

However, since the cost of the alumina fine particles is high, the tape member or sheet member, i.e., the final product, may become expensive in the case of this technique. Therefore, Example 4 is a method of using no alumina fine particles. That is, the same steps were carried out in this Example as Example 3, except that although a water slurry 18 of nano-alumina particles of 40 (nm) was used in the technique of Example 3, no water slurry 18 was used. The heat conductivity of the mica plate obtained in this Example was 0.32 (W/mK). The results of Example 4 are also shown in Table 1. As compared with Comparative Example, a heat conductivity about 1.3 times as high was obtained.

The heat conductivity in Example 4 was measured by the acetone-benzene method, as in Example 2. The heat conductivities of the following Examples 3 to 12 were also measured by the acetone-benzene method.

Example 5

In the above-mentioned Example 3 or 4, a technique of using silica gel produced by the sol-gel method as a binder was described. Since the inorganic binder was used for the mica paper produced by the method, the mica paper was inferior in flexibility. A mica tape produced by sticking the mica paper and a glass cloth to each other and then slitting the obtained laminate was rolled around a coil of an electromagnetic appliance (e.g. a generator or a motor) to form an insulating layer. If the tape is inferior in flexibility, the mica paper is cracked at the time of rolling and may lower the electric insulation property. Therefore, a tape-like material obtained by cutting the mica paper in a width of 25 (mm) was rolled on a square rod having a width of 25 (mm) and a thickness of 5 (mm) to test occurrence of the tape disconnection. In the case where the adhesion ratio of mica was 120 (g/cm$^2$), tape disconnection did not occur, however in the sample with the adhesion ratio of 240 (g/cm$^2$), the tape was disconnected. This is supposedly attributed to the fact that the silica gel is an inorganic binder and has low elongation property.

Figure 6:
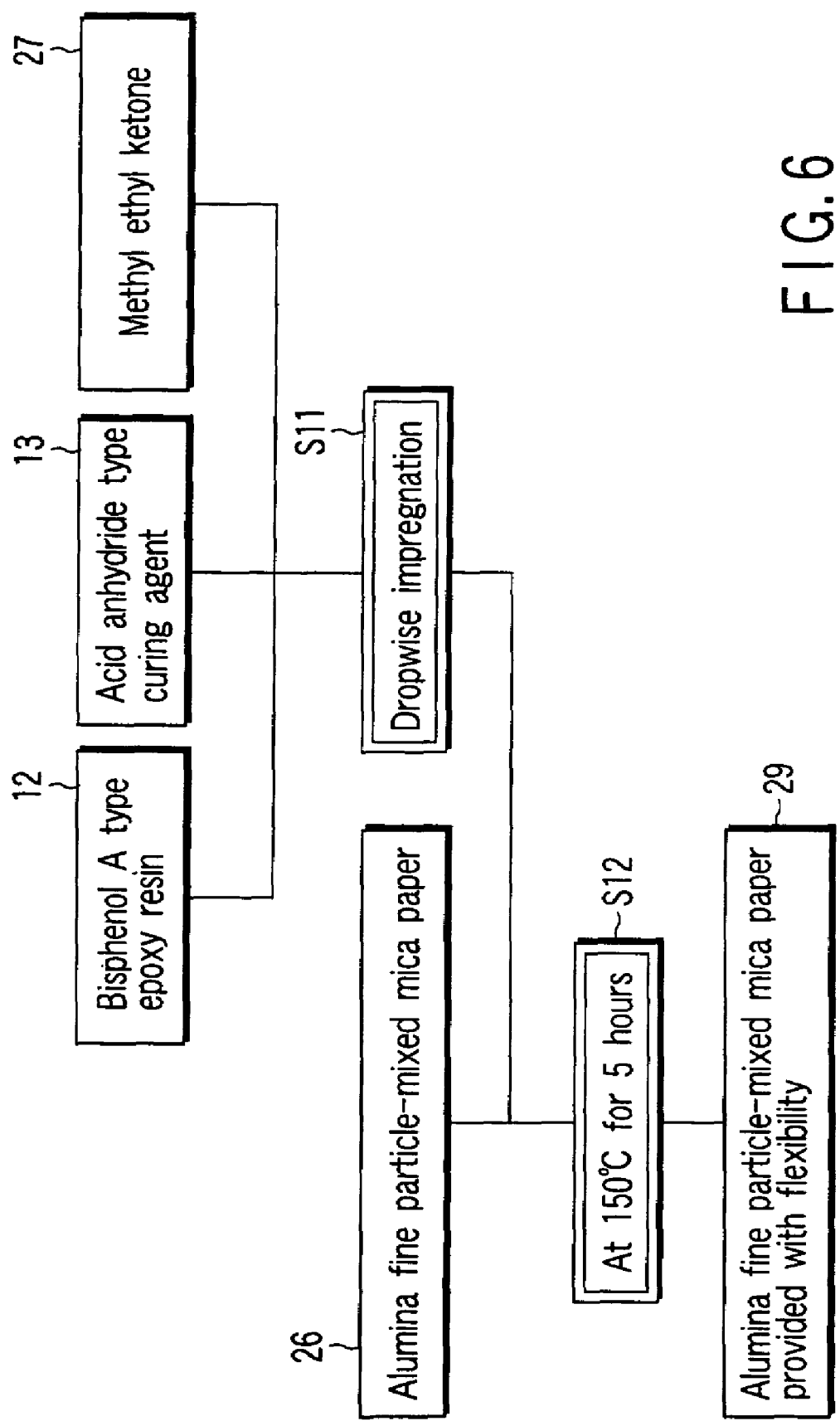
FIG. 6 is a flow chart describing a method of producing alumina fine particle-mixed mica paper of Example 4 of the invention.

Therefore, a solution obtained by diluting un-cured bisphenol A type epoxy resin with methyl ethyl ketone was applied to the mica paper obtained by the sol-gel method. Specifically, as shown in FIG. 6, the bisphenol A type epoxy resin 12 (CY 225, manufactured by Ciba Specialty Chemicals Inc.), an acid anhydride curing agent 13 (HY 925, manufactured by Ciba Specialty Chemicals Inc.), and methyl ethyl ketone 27 (methyl ethyl ketone, manufactured by Wako Pure Chemical Industries, Ltd.) were mixed, and the mixture was dropwise added from an upper side to impregnate the alumina fine particle-mixed mica paper 26 with the mixture (S11) and the resulting mica paper was heated at 150° C. for 5 hours for curing the resin to obtain alumina fine particle-mixed mica paper 29 provided with flexibility.

When the mica paper 29 obtained in such a manner was cut in a 25 (mm) width and rolled around the above-mentioned rod square, tape disconnection did not occur. This is supposedly attributed to the fact that the use of the organic resin as the binder guarantees flexibility. It is obvious that besides epoxy resin, silicone rubber, polyvinyl alcohol, and polyvinyl butyral may provide a similar effect. When 4 (ml) of methyl ethyl ketone was dropwise titrated to 600 (cm$^2$) of the tape of the mica paper which was produced by using the inorganic binder of 240 (g/cm$^2$) adhesion and which was disconnected and the mica paper was dried at a normal temperature and normal pressure for 5 hours, flexible mica paper was obtained. Although the reason is not clear, it is supposedly attributed to the fact that the solvent or the resin enter between the mica flakes and act as a lubricant.

Although the effect of methyl ethyl ketone 27 was confirmed, it is clear that other solvents such as ethyl alcohol, butyl alcohol, isopropanol, toluene, and xylene may cause similar effects.

Example 6

Figure 7:
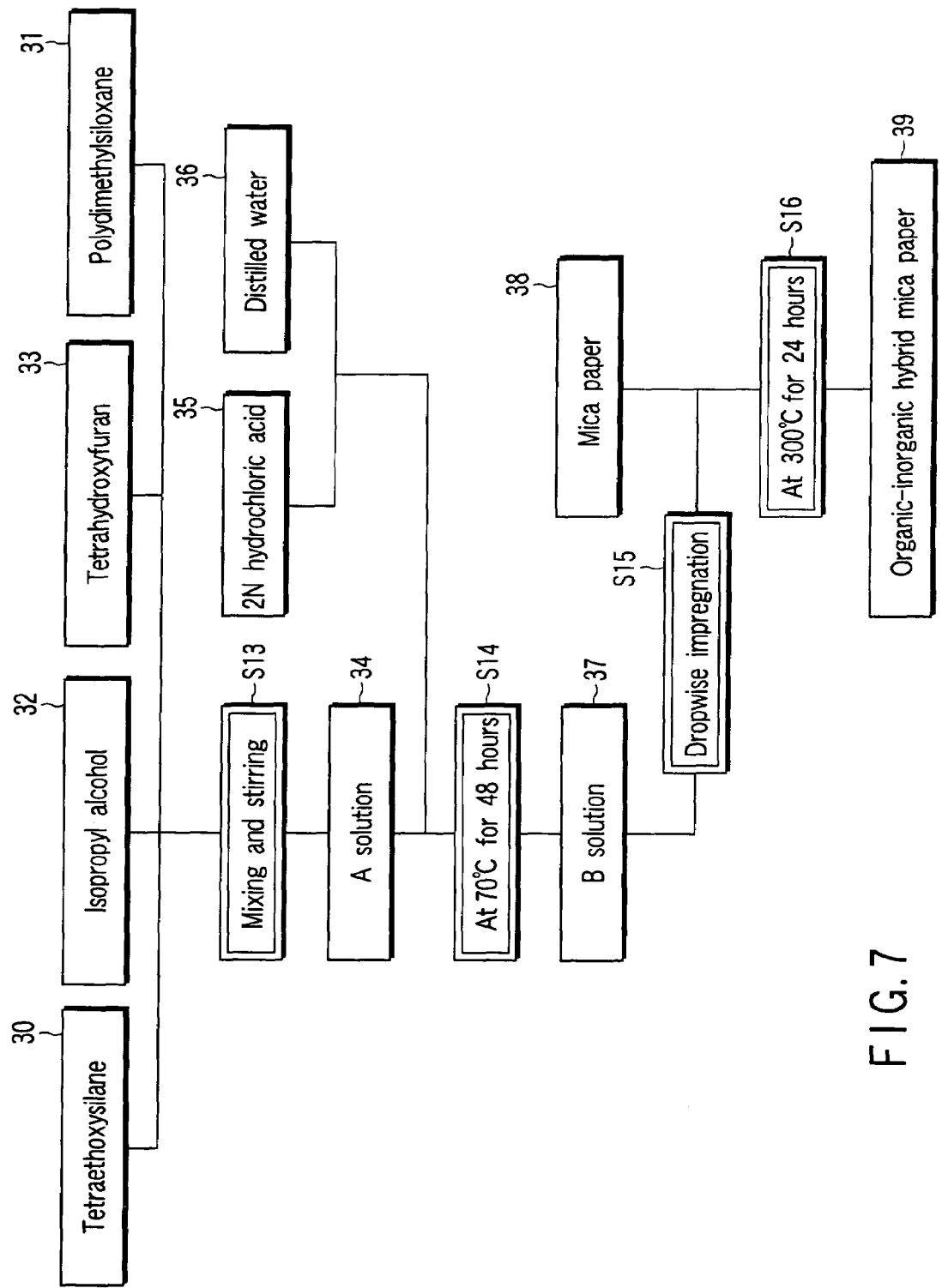
FIG. 7 is a flow chart describing a method of producing organic-inorganic hybrid mica paper of Example 5 of the invention.

This Example is a case of using a substance having a structure of an inorganic oxide precipitated or synthesized by the sol-gel method and chemically bonded with polymer chains as a binder. In the above-mentioned Example 3, in addition to the inorganic binder, the flexibility was obtained by using an organic binder and/or impregnating the mica paper with the reins. However, it was required to apply and dry the organic binder after the inorganic binder was synthesized and dried, and thus this method took a long time for the production process. Therefore, it is effective to use a binder having a structure of an inorganic oxide produced by the sol-gel method and chemically bonded with polymer chains, as shown in FIG. 7. Accordingly, 30 (ml) of tetraethoxysilane 30 (manufactured by High Purity Chemistry), 20 (ml) of polydimethylsiloxane 31 (XF 3095, manufactured by Toshiba Silicone Co., Ltd.), 15 (ml) of isopropyl alcohol 32 (Wako Pure Chemical Industries, Ltd.), and 10 (ml) of tetrahydroxyfuran 33 (manufactured by BASF) were put in a 200 ml beaker and stirred at a normal temperature and normal pressure by a stirrer for 2 hours to obtain a solution A 34 (S13). Under condition of stirring, 10 (ml) of 2 N hydrochloric acid 35 and 30 (ml) of distilled water 36 were dropwise added to the above-mentioned solution A 34. The obtained solution was heated at 70° C. for 48 hours in a closed round bottom flask to obtain a solution B 37 (S14). Similarly to the case of the inorganic binder of Example 3, the solution B 37 was dropwise titrated to impregnate the mica paper 38 with the solution (S15) and then the resulting mica paper was heated at 300 (° C.) for 24 hours to obtain organic-inorganic hybrid mica paper 39 (S16).

Since the mica paper 39 produced in such a manner contained inorganic fine particles, and since the inorganic fine particles and the organic component were chemically bonded, the mica paper exhibited high heat conductivity and flexibility.

Table 2 shows the test results relevant to the rolling property of the respective Examples shown in Example 1 to Example 5. Herein, the rolling property means the probability of tape rupture when each tape cut in a width of 25 (mm) is rolled around an aluminum bar of 5×25. It is made clear that a foil is formed by using the binder and the rolling property is improved in all of the methods except Example 2.

Example 8

Figure 9:
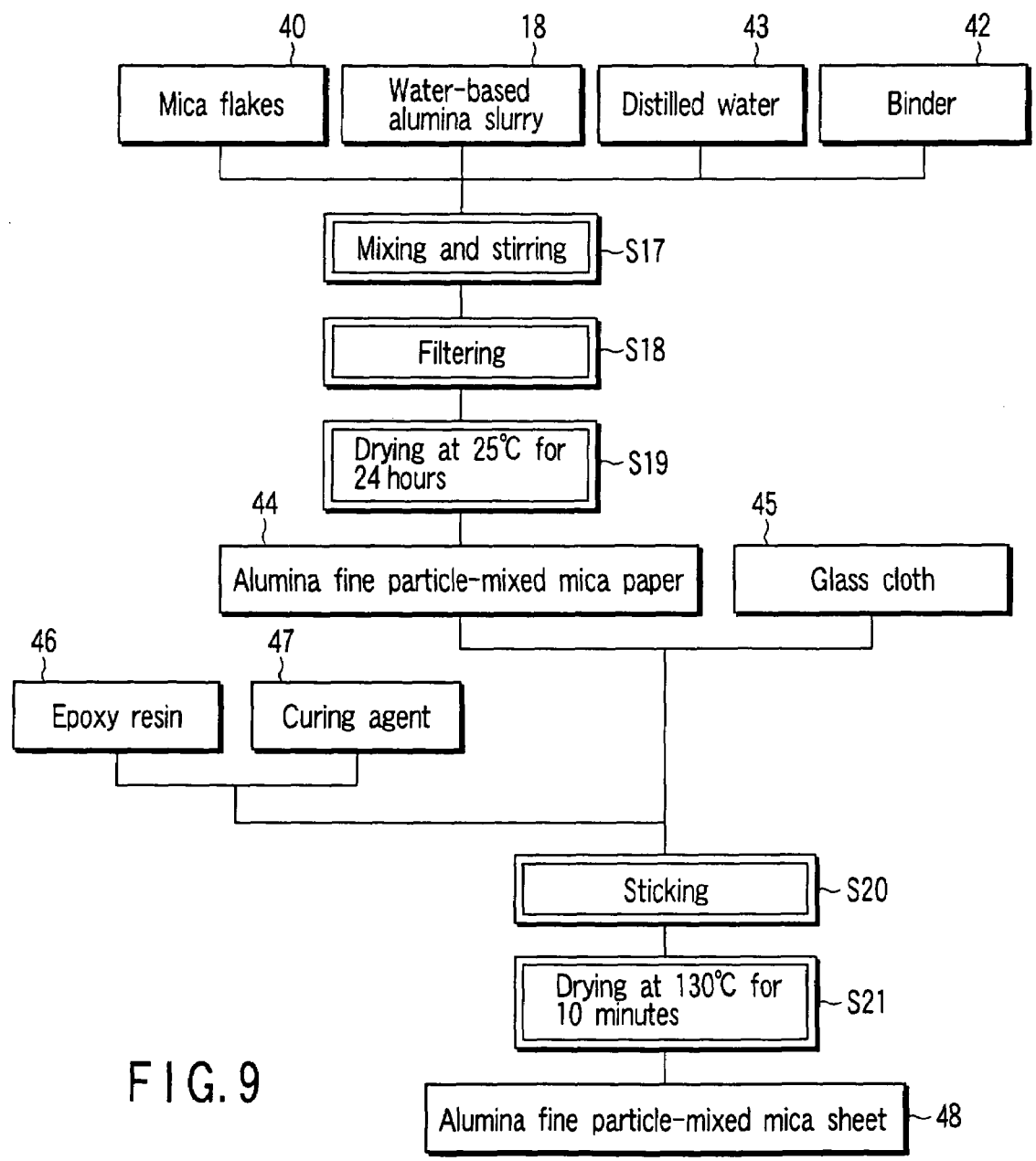
FIG. 9 is a flow chart describing a method of producing alumina fine particle-mixed mica sheet of Example 8 of the invention.

The method of producing a tape member or sheet member of Example 8 was carried out, as shown in FIG. 9, by stirring and mixing (dispersing) scaly particles, e.g. mica flakes 40, 15 (wt %) of a water slurry 18 containing alumina with a size of 40 (nm) and having heat conductivity of 0.5 (W/mK) or higher, and a binder 42 in a medium, e.g. distilled water 43 (S17); filtering the dispersion (S18); and successively carrying out drying at 25° C. for 24 hours (S19) to obtain an alumina fine particle-mixed mica sheet 44. After that, an alumina fine particle-mixed mica sheet 48 was obtained by sticking a lining material such as a glass cloth 45 to the above-mentioned mica paper 44 by using an epoxy resin 46 and a curing agent 47 (S20), and successively drying the resulting mica sheet at 130° C. for 10 minutes (S21).

Herein, steps of producing a mica paper or mica sheet carried out conventionally will be described with reference to FIG. 10. The mica flakes 40 and distilled water 43 were mixed and stirred (S17), the mixture was filtered (S18), and the mica

TABLE 2

|  | Comparative Example 1 | Example 1 | Example 2 | Example 3 | Example 4 | Example 5 |
| --- | --- | --- | --- | --- | --- | --- |
| Mica adhesion ratio | 240 g/m$^2$ | 120 g/m$^2$ | 240 g/m$^2$ | 240 g/m$^2$ | 240 g/m$^2$ | 240 g/m$^2$ |
| Alumina (40 nm) | 12 g/m$^2$ | 6 g/m$^2$ | 12 g/m$^2$ | 12 g/m$^2$ | 12 g/m$^2$ | 12 g/m$^2$ |
| Binder | None | Inorganic binder | Inorganic binder | Inorganic binder + solvent | Inorganic binder + resin | Organic-inorganic hybrid |
| Possibility of paper production | Impossible | Possible | Possible | Possible | Possible | Possible |
| Probability of cracking | — | 0 | ¾ | 0 | 0 | 0 |

In Example 6, a silicone type resin was used as the organic polymer chains, which was as effective as using an expoxy resin. In the case where mica paper was produced in the same manner as described above by using a solution B obtained by stirring 30 (ml) of tetraethoxysilane 30, 10 (ml) of a silane coupling agent A 187, 5 (ml) of distilled water, and 10 (ml) of ethanol in a 200 (ml) beaker for 10 minutes and dropwise titrating 0.6 (ml) of diethyleneamine, mica paper without tape disconnection could be produced. This is supposedly attributed to the fact that the epoxy group of A 187 is bonded with the amine to form organic polymer chains, and thus the flexibility is assured.

Example 7

Figure 8:
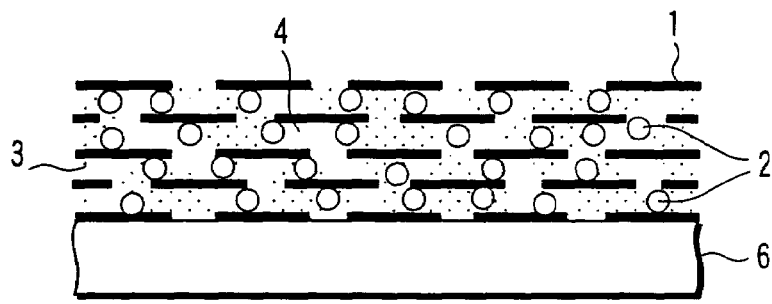
FIG. 8 is a cross-sectional view of a sheet member or a tape member for explaining Example 7 of the invention.

In Example 7, as shown in FIG. 8, a substance having continuous voids 4 was used as the binder 3. The mica tape was used to compose an insulating layer by being rolled around a coil of an electromagnetic appliance (e.g. a generator or a motor). A vacuum pressurizing impregnation method is available as the layer formation method. This is a method involving rolling the mica tape around the coil conductor, immersing the coil conductor in a resin for impregnation, applying successive vacuum/pressunzation of the impregnated coil conductor, and then curing the resin in a drier. In this case, it is required to increase the electric insulation property for the coil by sufficiently impregnating the mica tape with the resin, and thus easy impregnation of the mica tape with the resin is very important.

As shown in FIG. 8, use of a substance having continuous voids 4 as the binder 4 aids the impregnation. With this configuration, an insulator having a high electric insulation property and heat conduction property can be formed.

flakes remaining on the filter paper was dried at 25° C. for 24 hours (S19) to obtain the mica paper 49. After that, by sticking a lining material such as a glass cloth 45 to the above-mentioned mica paper 49 by using an epoxy resin 46 and a curing agent 47 (S20) and successively drying the resulting mica sheet at 130° C. for 10 minutes (S21), a mica sheet 50 was obtained.

The above-mentioned Example 8 is a production method without considerably changing production steps conventionally performed, as shown in FIG. 10, but only further adding 15 (wt %) of the water slurry 18 containing alumina with a size of 40 (nm) and having a heat conductivity of 0.5 (W/mK) or higher, and the binder 42. Accordingly, the method is excellent in lowering the production cost.

The above-mentioned production method of Example 8 is applicable as a production method for Examples 1 to 4.

Example 9

Figure 11:
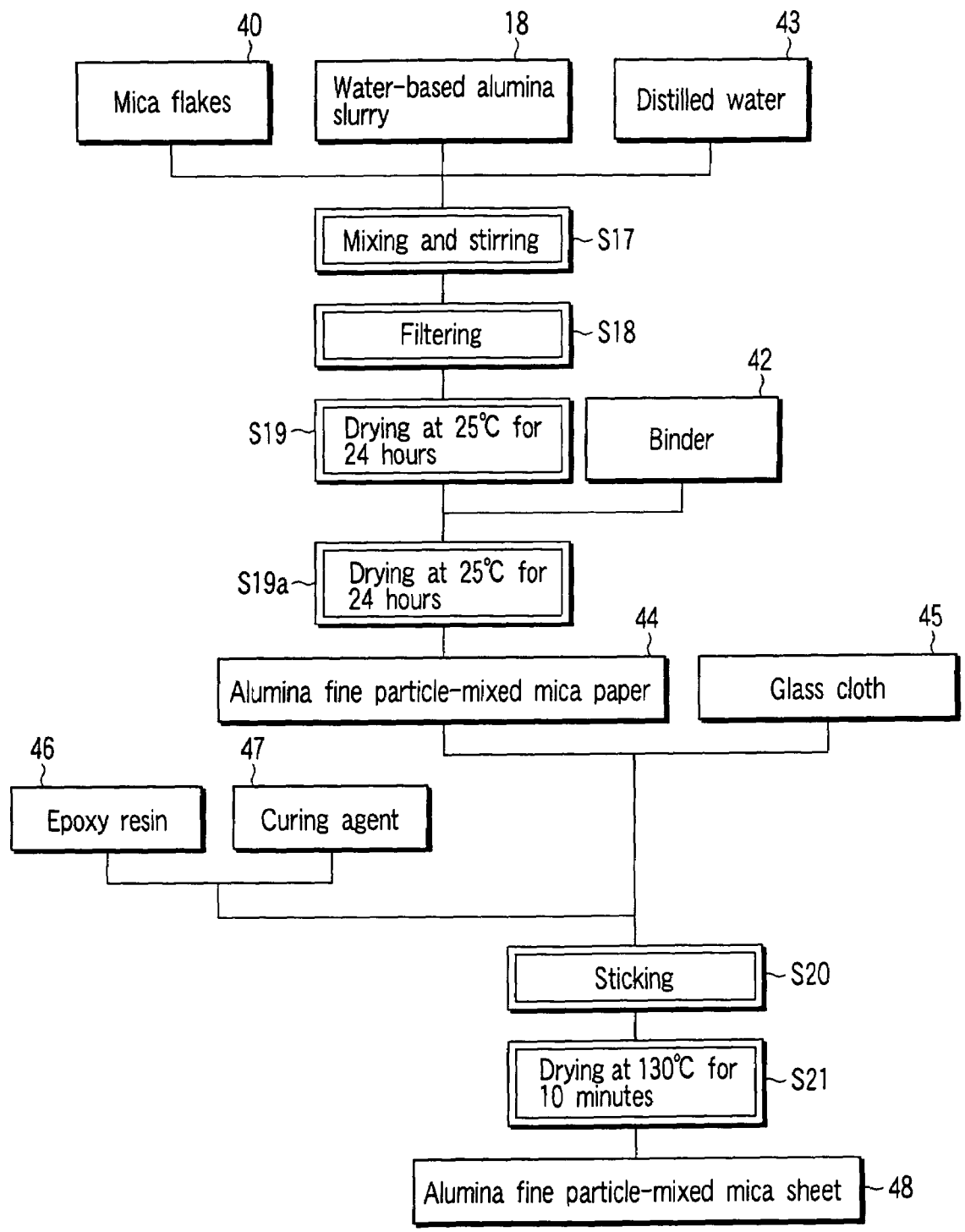
FIG. 11 is a flow chart describing a method of producing alumina fine particle-mixed mica sheet of Example 9 of the invention.

The method of producing a tape member or sheet member of Example 9 was carried out, as shown in FIG. 11, by stirring and mixing (dispersing) mica flakes 40 and 15 (wt %) of a water slurry 18 containing alumina with a size of 40 (nm) and having a heat conductivity of 0.5 (W/mK) or higher in a medium, e.g. distilled water 43 (S17); filtering the dispersion (S18); successively carrying out drying at 25° C. for 24 hours (S19); and thereafter, carrying out impregnation with a binder 42 and again drying at 25° C. for 24 hours (S19a) to obtain an alumina fine particle-mixed mica sheet 44. After that, an alumina fine particle-mixed mica sheet 48 was obtained by sticking a lining material such as a glass cloth 45 to the above-mentioned mica paper 44 by using an epoxy resin 46 and a curing agent 47 (S20) and successively drying the resulting mica sheet at 130° C. for 10 minutes (S21).

According to the production method of Example 9, this method is environment-friendly and economical in terms of the material cost. Although the production process described as Example 8 is excellent in production of the tape member or sheet member without increasing the number of process steps, the binder 42 is discharged much in vain in the filtration step of the production method shown in FIG. 9. On the other hand, in the case of the production method shown in FIG. 11, since the impregnation with the binder 42 is carried out before the final drying step after filtration and drying steps in the mica paper production, the loss of the binder 42 can be suppressed, and, as a result, the method can be environment-friendly and economical in terms of the material cost.

Example 10

The method of producing a tape member or sheet member of Example 10 was carried out, as shown in FIG. 12, by stirring and mixing (mixing and dispersing) scaly particles such as mica flakes 40 in a medium, e.g. distilled water 43 (S17); filtering the dispersion (S18); and successively carrying out drying at 25° C. for 24 hours (S19) to obtain intermediate paper.

On the other hand, a binder 42 and 15 (wt %) of a water slurry 18 containing alumina with a size of 40 (nm) and having a heat conductivity of 0.5 (W/mK) or higher were stirred and mixed (mixed and dispersed) (S19b), the above-mentioned intermediate paper was impregnated with the obtained alumina fine particle slurry and again dried at 25° C. for 24 hours (S19a) to obtain an alumina fine particle-mixed mica paper 44. After that, a mica sheet 48 was obtained by sticking a lining material, such as a glass cloth 45, to the above-mentioned mica paper 44 by Using an epoxy resin 46 and a curing agent 47 (S20) and successively drying the resulting mica sheet at 130° C. for 10 minutes (S21).

The above-mentioned Example 10 is effective, as described below. In the case of the production methods of the above-mentioned Examples 8 and 9, the particles having a heat conductivity of 0.5 (W/mK) or higher were much discharged in vain in the filtration step. On the other hand, in the method shown in FIG. 12, since impregnation of the mica paper 44 with the alumina fine particles 41 having a heat conductivity of 0.5 (W/mK) or higher and the binder 42 was carried out later, the loss of the binder 42 and alumina fine particles 42 can be lessened and as a result, the method can be environment-friendly and economical in terms of the material cost.

Example 11

Figure 13:
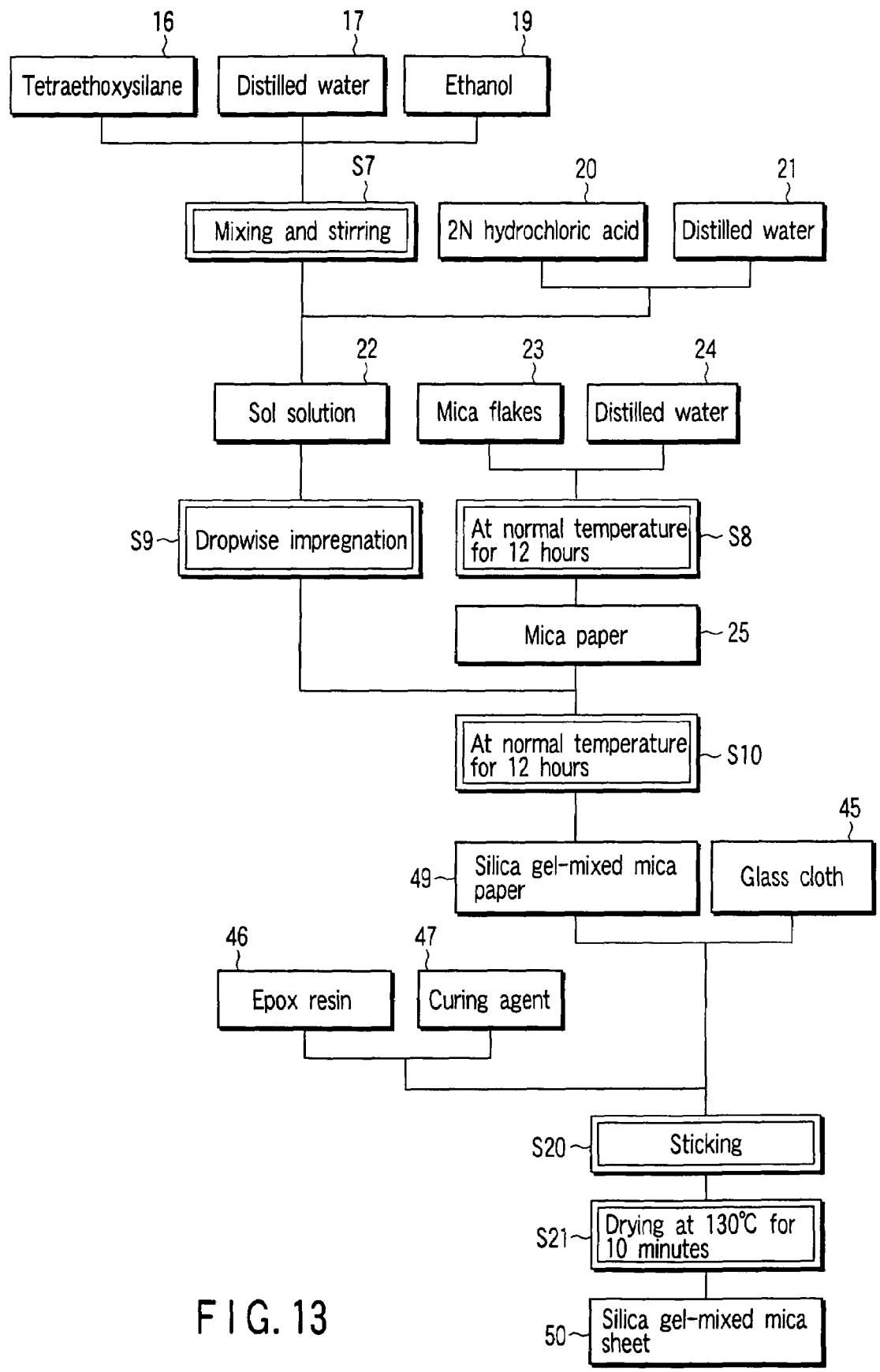
FIG. 13 is a flow chart describing a method of producing alumina fine particle-mixed mica sheet of Example 11 of the invention.

Example 11 was carried out as follows, as shown in FIG. 13: a metal alkoxide, e.g. tetraethoxysilane 16, water, e.g. distilled water 17, and a solvent, e.g. ethanol 19 were mixed to obtain a mixed solution, after which, as a catalyst, 1 (ml) of 2N hydrochloric acid 20 and distilled water 21 were dropwise added to the obtained mixed solution and stirred for 10 minutes to obtain a sol solution 22. On the other hand, mica flakes 23 were stirred and mixed (dispersed and mixed) in water, e.g. distilled water 24 and filtered and successively dried at a normal temperature and normal pressure for 12 hours (S8) to obtain intermediate mica paper 25. The intermediate mica paper 25 was impregnated with the above obtained sol solution 22 by dropwise addition (S9) and dried at a normal temperature and normal pressure for 12 hours (S10) to obtain an inorganic binder-mixed paper, e.g. silica gel-mixed mica paper 49. After that, as in Example 11, a mica sheet, e.g. a silica gel-mixed mica sheet 50 was obtained by sticking a lining material such as a glass cloth 45 to the above-mentioned mica paper 26 by using an epoxy resin 46 and a curing agent 47 (S20) and successively drying the resulting mica sheet at 130° C. for 10 minutes (S21).

This Example is effective similarly as described above.

Example 12

Figure 14:
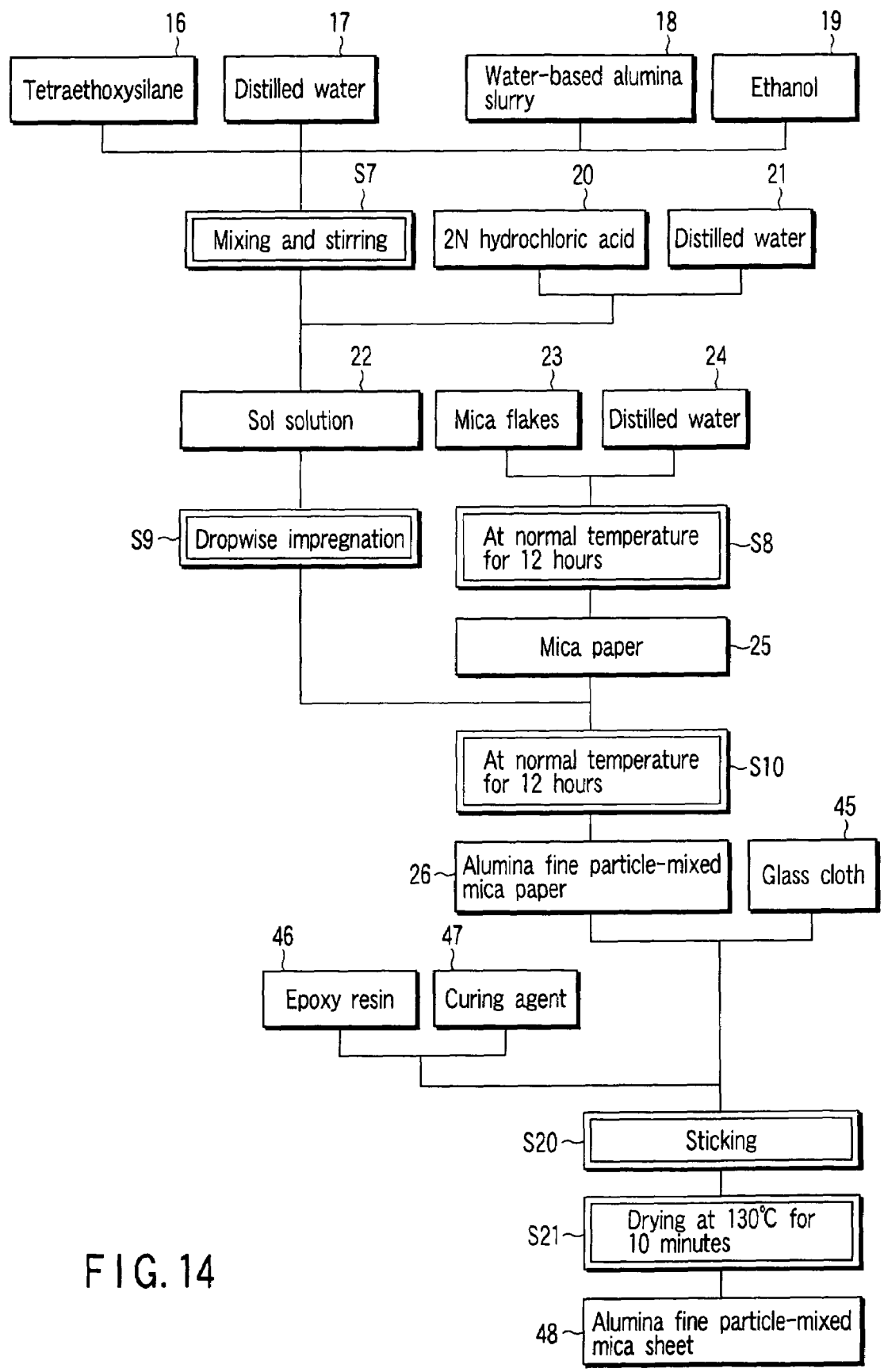
FIG. 14 is a flow chart describing a method of producing alumina fine particle-mixed mica sheet of Example 12 of the invention.

Example 12 was carried out, as shown in FIG. 14, by obtaining a mixed solution by mixing a metal alkoxide, e.g. tetraethoxysilane 16, water, e.g. distilled water 17, a slurry, e.g. a water slurry 18, obtained by mixing particles having heat conductivity of 0.5 (W/mK) or higher and a size of 1 μm or smaller in water or a solvent, and a solvent, e.g. ethanol 19 and then carrying out the same steps as the above described Example 11.

Example 13

FIG. 15 is an explanatory drawing for an example of a conductor 5 of an electromagnetic coil using the sheet member or tape member obtained by one of the production methods of Examples 1 to 7. The sheet member or tape member obtained by one of the production methods of Examples 1 to 7 is a member excellent in the heat conduction property and flexibility. Further, it is provided with a high heat conduction property by impregnating the glass cloth, which is the lining material, with highly heat conductive boron nitride (HP-6, manufactured by Mizushima Ferroalloy Co., Ltd.).

A mica tape obtained by applying a resin, which was obtained by kneading Septon 2007, 60 (% by volume) of boron nitride, and 10 (% by volume) of alumina with a size of 70 (nm), to the glass cloth, the lining material of the mica paper having high heat conductivity obtained in Example 3, was cut into 30 mm width, the cut mica tape was rolled around a coil conductor, a release type tape of polypropylene was rolled thereon, and vacuum impregnation with bisphenol A type epoxy resin was carried out. The resulting coil conductor was taken out and a supporting plate made of aluminum was attached to the four faces of the coil and a thermally shrinkable tube was put around the coil. The resulting coil body was dried for curing at 150° C. for 10 hours in a drying apparatus to obtain a coil.

The electromagnetic coil produced in such a manner was excellent in the heat releasing property. A disk with a diameter of 35 mm and a thickness of 2 mm was cut out from the insulating layer 6 and subjected to heat conductivity measurement by the acetone-benzene method to find the heat conductivity to be 0.8 W/mK. The heat conductivity of the main insulating layer formed by the conventional method was about 0.22 W/mK.

Example 14

FIG. 16 is an explanatory cross-sectional drawing for an example of use of the sheet member or tape member obtained by the production method of Example 8 for an insulator of a generator. The generator manufactured in this manner was excellent in the coil cooling property and thus the temperature increase of the coil was suppressed. The coil excellent in the heat releasing property and obtained in Example 13 was inserted into an iron core, electric current was applied, and the coil temperature increase was measured. As a result, in the coil produced in this Example, the coil temperature was suppressed to about 10 (K) as compared with that of a conventional mica tape and thus it was found that the coil had a very efficient cooling capability. That is, since electric current density can be increased for a coil with the same shape and size, the weight of copper and iron can be reduced.

Also, a highly efficient generator could be obtained by using the sheet member or tape member obtained by the production method described in Example 9.

The invention is applicable to electromagnetic coils, electromagnetic appliances, power generators and the like.

What is claimed is:

1. A mica tape member or mica sheet member used for insulation of an electromagnetic appliance and comprising a mica-containing layer and a lining material,
    wherein the mica-containing layer contains scaly particles, heat conductive particles having a heat conductivity of 0.5 W/mK or higher and a size of 1 μm or smaller, and a binder, the binder being compound with the heat conductive particles and the scaly particles to disperse the heat conductive particles between the scaly particles.

2. The tape member or sheet member according to claim 1, wherein the binder is a substance precipitated or synthesized by a sol-gel method.

3. The tape member or sheet member according to claim 1, wherein the binder is a substance precipitated or synthesized by a sol-gel method and containing an organic type resin.

4. The tape member or sheet member according to claim 1, wherein the binder is a substance having a structure formed by chemically bonding polymer chains to an inorganic oxide precipitated or synthesized by a sol-gel method.

5. The tape member or sheet member according to claim 1, wherein the binder is a water-soluble polymer.

6. The tape member or sheet member according to claim 1, wherein the binder is a thermoplastic resin or a thermosetting resin.

7. The tape member or sheet member according to claim 1, wherein the mica-containing layer consists of scaly particles and a substance precipitated or synthesized by a sol-gel method.

* * * * *